(12) United States Patent
Kim et al.

(10) Patent No.: US 8,051,965 B2
(45) Date of Patent: Nov. 8, 2011

(54) CLUTCH ACTUATOR

(75) Inventors: Il Soo Kim, Seoul (KR); Sang Chul Park, Suwon (KR); Jeong Heon Kam Song, Yongin (KR); Han Ho Hwang, Yongin (KR); Woo Jin Cha, Yongin (KR); Kwang Soo Nam, Yongin (KR); Young Kwang Kim, Yongin (KR)

(73) Assignees: Hyundai Motor Company, Seoul (KR); Kia Motors Corporation, Seoul (KR); Hyundai Mobis, Yongin (KR)

( * ) Notice: Subject to any disclaimer, the term of this patent is extended or adjusted under 35 U.S.C. 154(b) by 414 days.

(21) Appl. No.: 12/324,482

(22) Filed: Nov. 26, 2008

(65) Prior Publication Data
US 2009/0229943 A1 Sep. 17, 2009

(30) Foreign Application Priority Data
Mar. 12, 2008 (KR) .................. 10-2008-0022906

(51) Int. Cl.
*F16D 28/00* (2006.01)
*F16H 21/44* (2006.01)
*F16H 55/22* (2006.01)

(52) U.S. Cl. ............ 192/20; 192/84.6; 74/89.14; 74/425
(58) Field of Classification Search ................ None
See application file for complete search history.

(56) References Cited

U.S. PATENT DOCUMENTS

| | | | |
|---|---|---|---|
| 4,852,419 A * | 8/1989 | Kittel et al. ................ | 74/89.14 |
| 4,878,396 A | 11/1989 | Grunberg | |
| 5,678,673 A * | 10/1997 | Borschert et al. ........... | 192/84.6 |

* cited by examiner

*Primary Examiner* — David D Le
*Assistant Examiner* — Jacob S Scott
(74) *Attorney, Agent, or Firm* — Morgan, Lewis & Bockius LLP

(57) ABSTRACT

A clutch actuator is configured to change operational force applied to a clutch in cases that a worm wheel is rotated by a motor. The clutch actuator may include a motor provided with a rotatable worm shaft, a screw thread formed along an exterior circumference of the worm shaft, a worm wheel provided with a worm gear engaging the screw thread, and a cam recess, an operation rod mounted to the worm wheel, the operation rod configured to engage or release a clutch, and a rotatable operation unit disposed within the cam recess, and configured to apply elastic force to the worm wheel. Methods of using the clutch actuator are also described.

12 Claims, 7 Drawing Sheets

CLUTCH ACTUATOR

CROSS-REFERENCE TO RELATED APPLICATION

This application claims priority to, and the benefit of, Korean Patent Application No. 10-2008-0022906, filed in the Korean Intellectual Property Office on Mar. 12, 2008, the entire contents of which are incorporated herein for all purposes by reference.

BACKGROUND OF THE INVENTION

1. Field of the Invention

The present invention relates to a clutch actuator. More particularly, the present invention relates to a clutch actuator that changes operation force applied to a clutch by a worm wheel rotated by a motor.

2. Description of Related Art

Generally, a clutch actuator for a manual transmission uses hydraulic pressure to control engaging and releasing of a clutch. A conventional clutch actuator generally includes a clutch disk, a clutch cover, a clutch fork, an operation cylinder, a master cylinder, and a clutch pedal.

A clutch fork engages or releases a clutch cover to a clutch disk by contacting or releasing the cover and disk. The clutch disk and the clutch cover are thus frictionally engaged such that torque applied to the clutch cover is transmitted to the clutch disk. That is, in a case in which the clutch disk and the clutch cover are closely contacted, the torque of the clutch cover is transmitted to the clutch disk by the frictional force. When the clutch disk is separated from the clutch cover, the clutch disk and the clutch cover rotate separately.

The clutch fork closely contacts the clutch cover to the clutch disk or separates the clutch cover from the clutch disk so as to engage or release the clutch. The clutch fork is operated by the operation cylinder. The master cylinder generates hydraulic pressure that is supplied to the operation cylinder and is mounted between the clutch pedal and the operation cylinder. Therefore, when the driver pushes the clutch pedal, the master cylinder generates hydraulic pressure and supplies the hydraulic pressure to the operation cylinder to engage the disk and cover.

Such actuators are used mainly for manual transmissions. However, the use of manual transmissions is decreasing because of control difficulties thereof. On the contrary, use of double clutch transmissions (DCTs) or automated manual transmissions (AMTs) are on the rise. In double clutch and automated manual transmissions, the clutch is controlled by an electrical signal. Therefore, a pressure-operated clutch actuator is difficult to apply in these cases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to a clutch actuator including a motor provided with a rotatable worm shaft, a screw thread formed along an exterior circumference of the worm shaft, a worm wheel provided with a worm gear engaging the screw thread, and a cam recess, an operation rod mounted to the worm wheel, the operation rod configured to engage or release a clutch, and/or a rotatable operation unit disposed within the cam recess, and configured to apply elastic force to the worm wheel.

The cam recess may be configured such that elastic force applied to the worm wheel by the operation unit is maintained within a predetermined range when the worm wheel rotates.

The operation unit may include at least two supporting rods disposed substantially parallel to each other, at least two elastic members applying the elastic force along a predetermined direction of the supporting rods, a rotatable connecting portion connected to first ends of the supporting rods, at least two seats mounted at respective second ends of the supporting rods receiving the elastic force from the elastic members, and/or a first roller connecting at least two seats, disposed in the cam recess, and configured to apply the elastic force of the elastic members to the worm wheel.

The operation unit may further include at least two supporting rods disposed substantially parallel with each other, at least two elastic members applying the elastic force in a predetermined direction by the supporting rods, a rotatable connecting portion connected to ends of the supporting rods, at least two seats mounted at respective second ends of the supporting rods and receiving the elastic force from the elastic members, a first roller connecting at least two seats, disposed in the cam recess, and configured to apply the elastic force of the elastic member to the worm wheel, and/or a rail extending from the connecting portion to the first roller.

The elastic members may be coil springs, and each may be coiled around one of the supporting rods. The cam recess may be configured such that the length of the coil springs is maintained within a predetermined length range when the worm wheel rotates. The elastic members may be coil springs, and each may be coiled around one of the supporting rods. The cam recess may be configured such that the length of the coil springs is maintained within a predetermined length range when the worm wheel rotates.

A second roller for guiding the operation unit on the rail may be mounted at a surface of the cam recess. Any of the above-mentioned supporting rods may be a telescoping cylinder such that the length thereof can be changed. Any of the above-mentioned supporting rod may include an inner rod slidably disposed in an outer rod.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
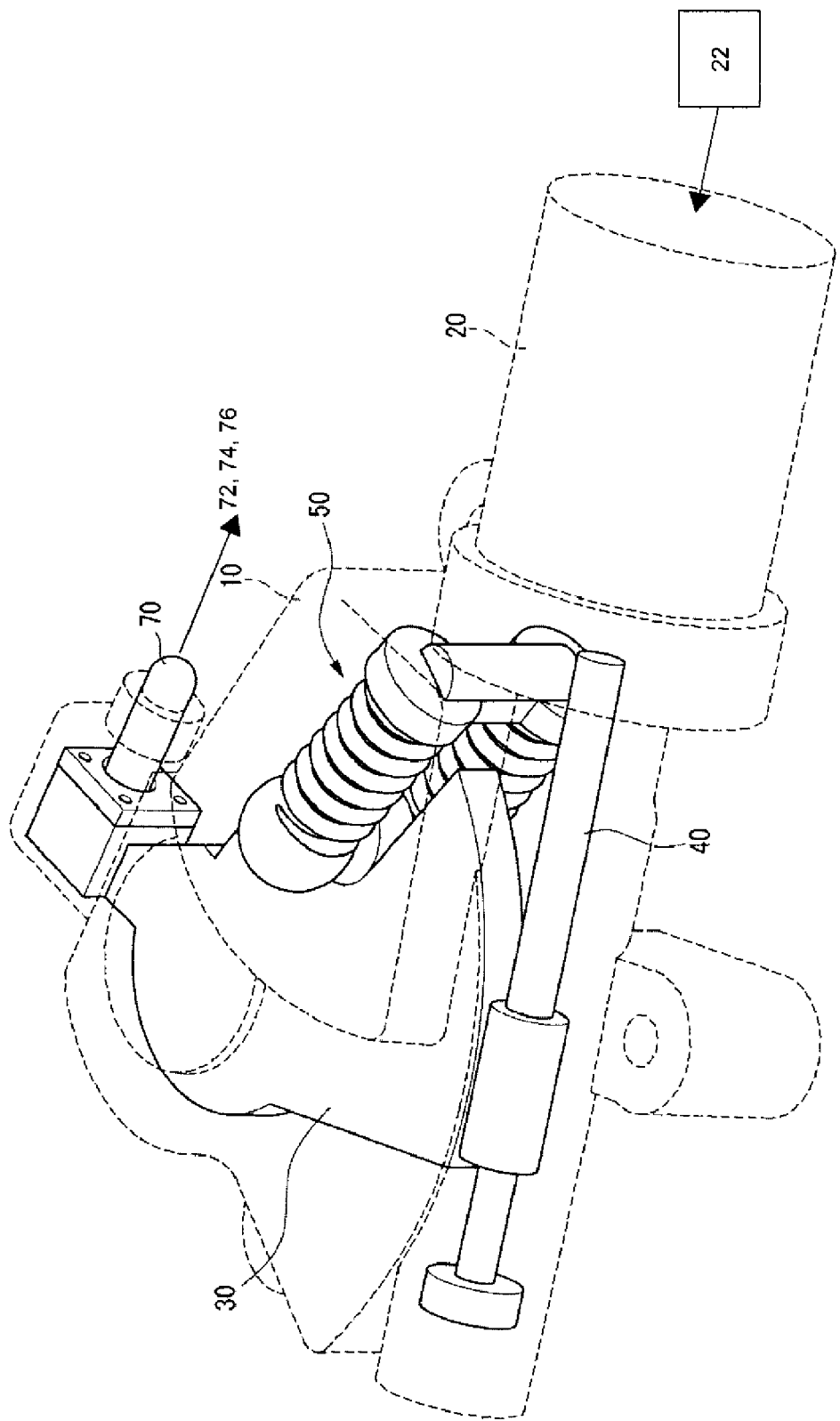
FIG. 1 is a perspective view of the interior of an exemplary clutch actuator in accordance with various aspects of the present invention.

As shown in FIG. 1, a clutch actuator according to an exemplary embodiment of the present invention includes a housing 10 and a motor 20. Mounted in the housing 10 are a worm wheel 30, an operation rod 70, and an operation unit 50.

The motor 20 receives an electric signal from a control unit 22 and rotates a worm shaft 40. A screw thread 42 (see, e.g., FIG. 4) is provided along an exterior circumference of the worm shaft 40. The control unit generates a electric signal for controlling an operation of a clutch based on driving conditions such as vehicle speed and engine speed. The control unit 22 transmits the electric signal to the motor 20 as a control signal of the motor 20. The motor may be a DC motor or a step motor. In addition, the motor 20, and may be installed in the housing 10 or at an exterior of the housing 10. In various embodiments in which the motor 20 is mounted at the exterior of the housing 10, the worm shaft 40 penetrates the housing 10. The worm shaft 40 engages with the worm wheel 30.

Figure 3:
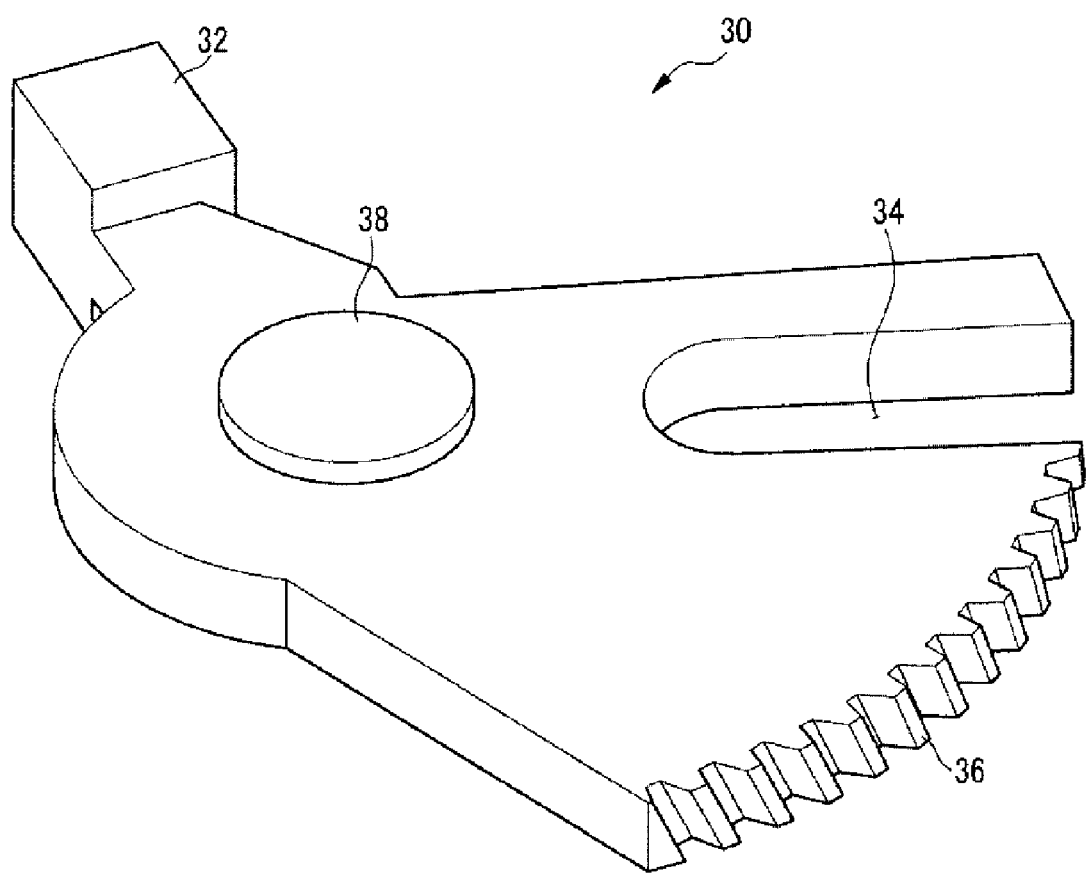
FIG. 3 is a perspective view of a worm wheel used in a the clutch actuator of FIG. 1.

As shown in FIG. 3, the worm wheel 30 has a fan shape and is rotatably mounted to the housing 10 by a shaft 38. A worm gear 36 is provided along an exterior circumference of the worm wheel 30 and engages with the screw thread 42 of the worm shaft 40. When the motor 20 rotates, the worm wheel 30 rotates about the shaft 38, which may be substantially perpendicular to the worm shaft 40. In addition, a receiving portion 32 is provided on an opposite side of the worm gear 36 and the operation rod 70 is mounted in the receiving portion 32. A cam recess 34 is provided along a radial direction of the worm wheel 30. The shape of the cam recess 34 will be described in more detail below.

The operation rod 70 is mounted in the receiving portion 32 of the worm wheel 30, and one end of the operation rod 70 penetrates the housing 10 and is connected to an otherwise conventional clutch cover 72, either directly or via a clutch fork 74.

Figure 2:
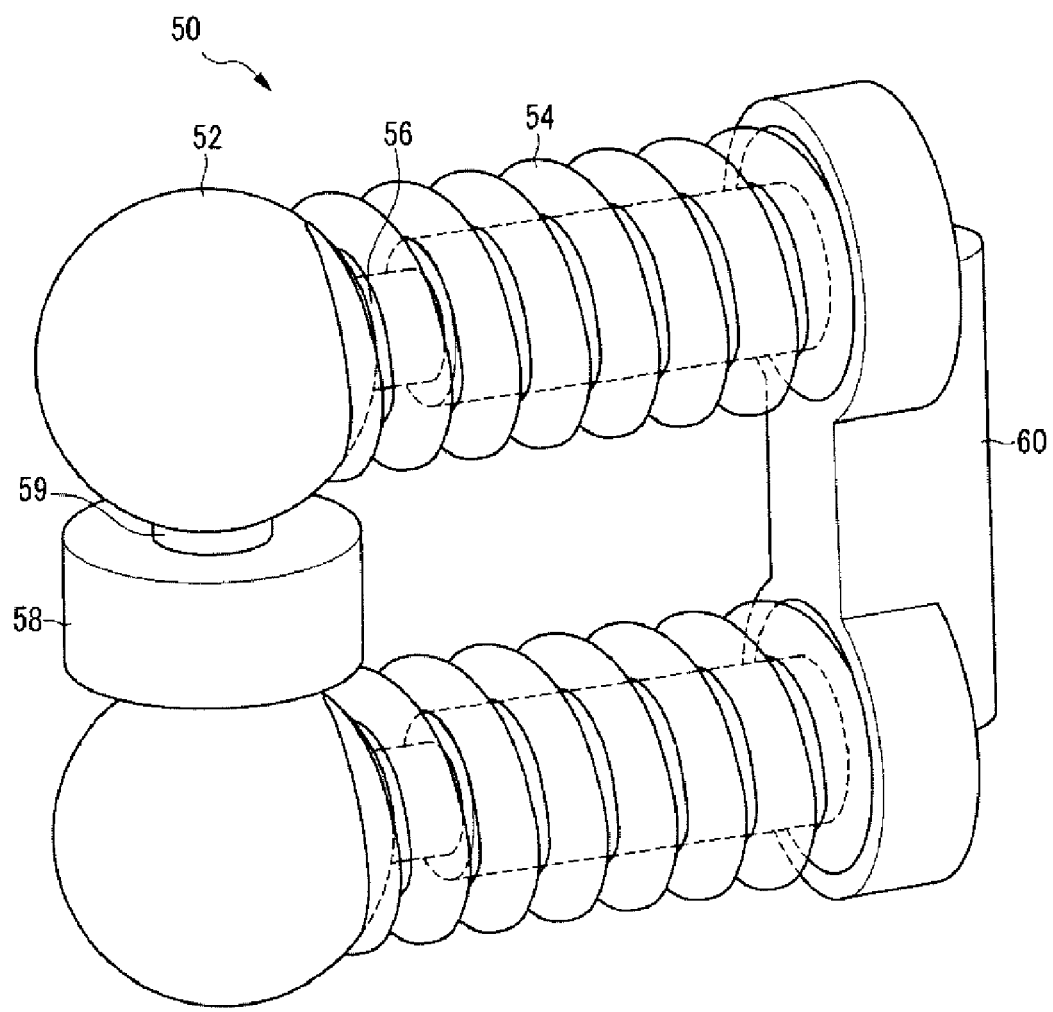
FIG. 2 is a perspective view of an operation unit used in the clutch actuator of FIG. 1.

As shown in FIG. 2, the operation unit 50 includes supporting rods 56, elastic members 54, a connecting portion 60, seats 52, and a first roller 58.

In various embodiments, at least two supporting rods 56 may be provided for mounting the first roller 58, and in various embodiments, the at least two supporting rods 56 are substantially parallel to one another. The first roller 58 is mounted between the two parallel supporting rods 56. Each supporting rod 56 may be formed as a double or telescoping cylinder such that length thereof can be changed. Each rod may include an inner cylinder is inserted slidably disposed within an outer cylinder, penetrates the outer cylinder, and moves along a length direction thereof such that the length of the supporting rod 56 is changeable.

The elastic member 54 applies elastic force in a predetermined direction, for example, in a direction parallel with the length direction or longitudinal axis of the supporting rod 56. The elastic member 54 may be a coil spring, and the coil spring may be coiled around the supporting rod 56.

The connecting portion 60 is connected to one end of the supporting rod 56, for example, the outer cylinder, and is rotatably mounted at the housing 10.

The seat 52 is mounted at the other end of the supporting rod 56, for example, the inner cylinder. The elastic member 54 applies elastic force to the seat 52, which is mounted between the seat 52 and the connecting portion 60. Because the diameter of the seat 52 is larger than that of the elastic member 54, the elastic member 54 applies elastic force to the seat 52 and the seat 52 can be moved or slid along the length of the supporting rod 56 by the elastic force of the elastic member 54.

The first roller 58 connects at least two seats 52 with each other. The first roller 58 is rotatably supported by a pressure pin 59, and respectively ends of the pressure pin 59 are fixed to the seats 52. Therefore, the elastic force of the elastic member 54 is transmitted to the first roller 58 through the seats 52.

In addition, the first roller 58 is mounted in the cam recess 34 and is guided by the cam recess 34. That is, when the worm wheel 30 rotates, the operation unit 50 rotates about the connecting portion 60. The first roller 58 is guided by the cam recess 34 and applies the elastic force of the elastic member 54 to the worm wheel 30. The lengths of the springs 54 and cam recess 34 may be selected such that an elastic force of a predetermined range, that is, a desired selected force is applied to the worm wheel 30 when the worm wheel 30 rotates. In various embodiments in which the elastic member 54 is a coil spring, the cam recess 34 may be configured such that length of the coil spring is maintained within a predetermined length range when the worm wheel 30 rotates. When the length of the coil spring is within the predetermined length range, a clutch may be engaged by the elastic force of the coil spring. One will appreciate that the predetermined length range can be readily determined based upon various parameters.

Figure 4:
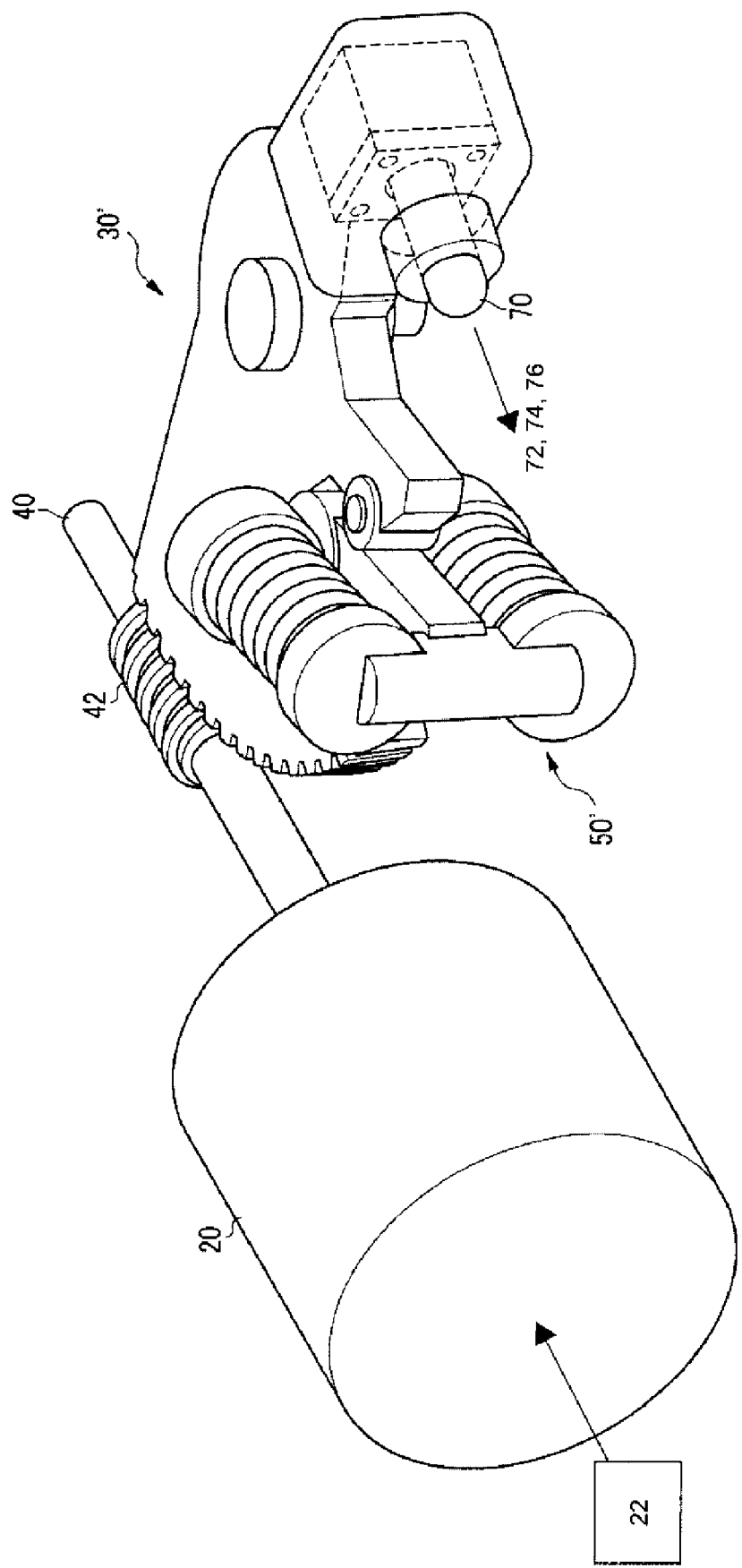
FIG. 4 is a perspective view of another exemplary clutch actuator according to various aspects of the present invention.
Figure 5:
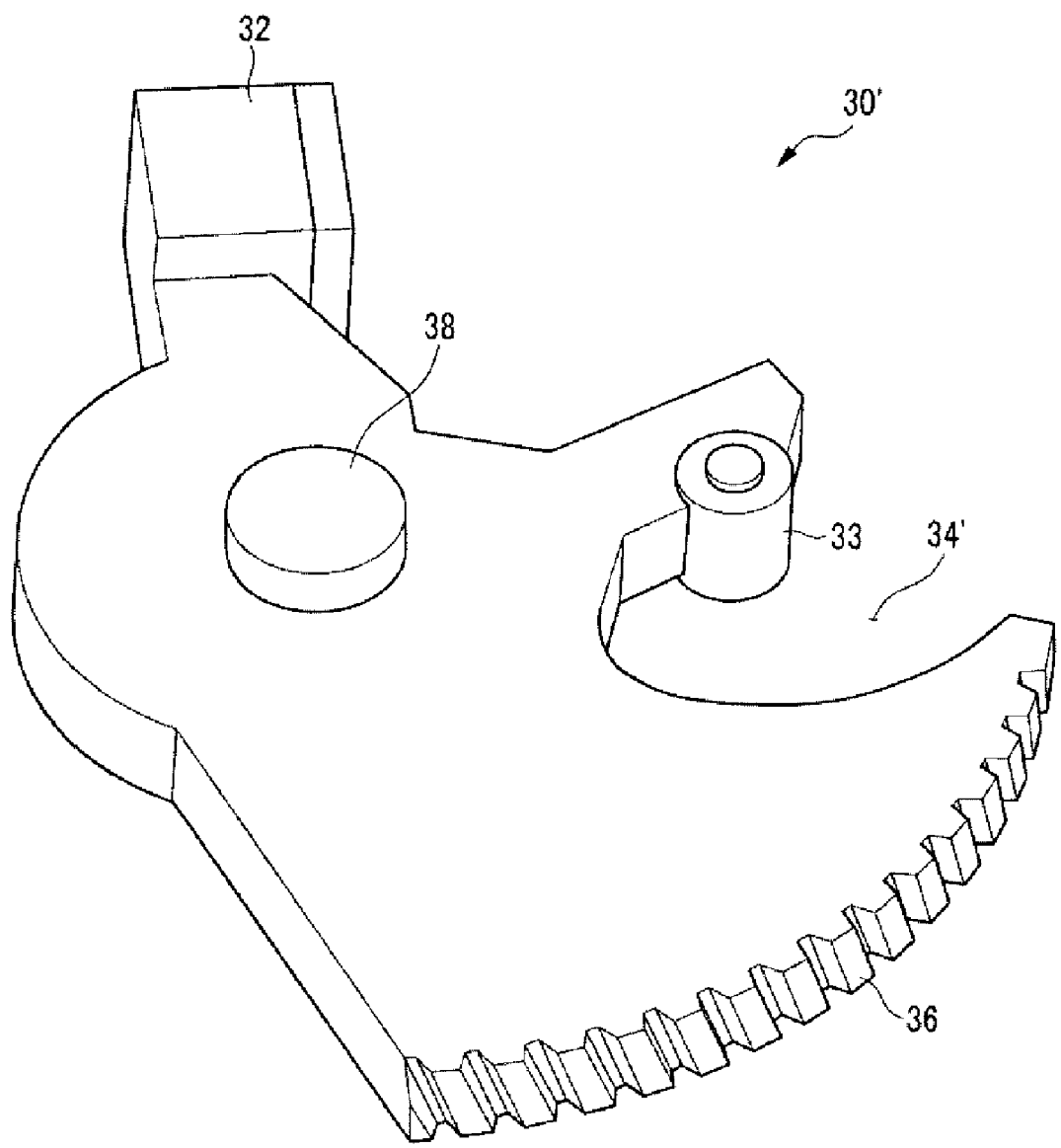
FIG. 5 is a perspective view of a worm wheel used in a the clutch actuator of FIG. 4.
Figure 6:
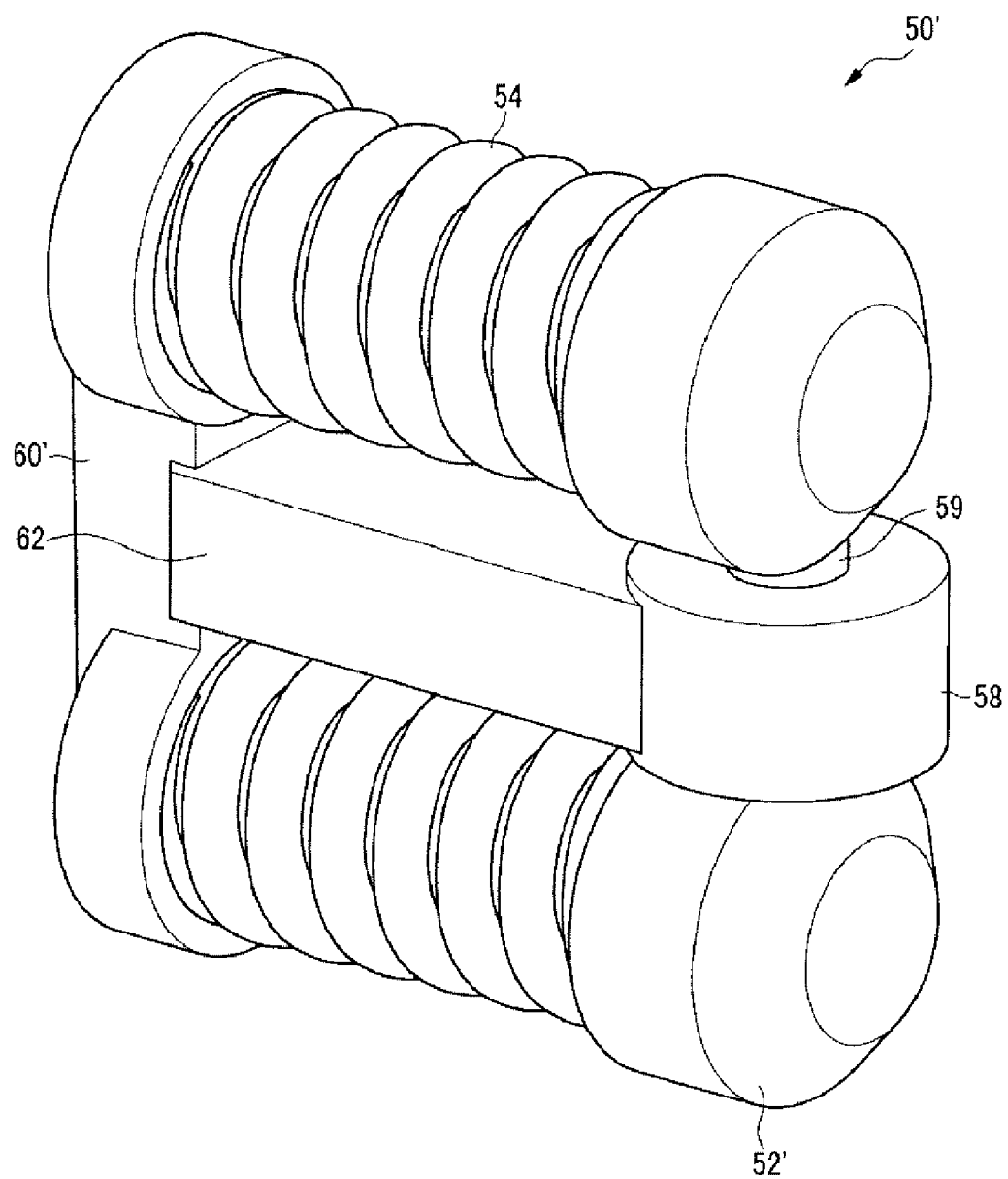
FIG. 6 is a perspective view of an operation unit used in the clutch actuator of FIG. 4.

Referring to FIG. 4 to FIG. 6, a clutch actuator according to another exemplary embodiment of the present invention will hereinafter be described. The structure of the clutch actuator according to other various embodiments of the present invention is similar to that of the clutch actuator described above, and various components may be identical to those of the actuator shown in FIGS. 1-3. Therefore, the same reference numerals are used for the same constituent elements, and detailed descriptions thereof will be omitted.

As shown in FIG. 4 to FIG. 6 an alternative exemplary clutch actuator according to the various aspects of the present invention includes a housing 10, a motor 20, a worm wheel 30', an operation rod 70, and an operation unit 50'. As the housing 10, the motor 20, and the operation rod 70 of this exemplary embodiment are the similar as the housing 10, the motor 20, and the operation rod 70 described above, detailed descriptions thereof will be omitted.

The worm wheel 30' has a fan shape and is rotatably mounted to the housing 10 by a shaft 38. A worm gear 36 is provided along an exterior circumference of the worm wheel 30' and engages with the screw thread 42 of a worm shaft 40. In addition, a receiving portion 32 is formed on the opposite side of the worm gear 36, and the operation rod 70 is mounted in the receiving portion 32. In addition, a cam recess 34' is provided along the radial direction of the worm wheel 30', and a second roller 33 is provided at one surface of the cam recess 34'. The second roller 33 is rotatably mounted to the housing 10.

The operation unit 50' includes supporting rods 56 (see, e.g. FIG. 2), elastic members 54, a connecting portion 60', seats 52', a first roller 58, and a rail 62. The supporting rods 56 and elastic members 54 may be similar or identical to those described above.

Connecting portion 60' may be connected to one end of the supporting rods 56, for example, the outer cylinders, and is rotatably mounted at the housing 10.

The seats 52' may be disposed substantially parallel with each other, and may be formed as a double or telescopic cylinder such that the length thereof can be changed.

The elastic member 54 applies elastic force in a predetermined direction, for example, a direction substantially parallel with the length direction or longitudinal axis of the supporting rod 56. The elastic member 54 may be a coil spring, and the coil spring coils around the supporting rod 56.

The connecting portion 60' is connected to one end of the supporting rod 56, for example, the outer cylinder, and is rotatably mounted at the housing 10.

The seat 52' is mounted at the other end of the supporting rod 56, for example, the inner cylinder, and the seat 52' can be moved along the length of the supporting rod 56 by elastic force of the elastic member. The seat may have various shapes, for example, a spherical or a cylindrical shape.

The first roller 58 connects at least two seats 52' with each other. The first roller 58 is rotatably supported by a pressure pin 59, whose ends are fixed to the seats 52'.

In addition, the first roller 58 is mounted in the cam recess 34' and is guided by the cam recess 34'. When the worm wheel 30' rotates, the operation unit 50 also rotates about the connecting portion 60'. At this time, the first roller 58 is guided by the cam recess 34' and applies the elastic force of the elastic member 54 to the worm wheel 30'. In this case, the cam recess 34' is configured such that the elastic force of a predetermined range is applied to the worm wheel 30 in a case that the worm wheel 30' rotates. If the elastic member 54 is the coil spring, the cam recess 34' is configured such that the length of the coil spring is maintained within a predetermined length range when the worm wheel 30' rotates. The second roller 33 provided in the cam recess 34' of operation unit 50' according to various embodiments of the present invention, the other. The surface of the cam recess 34' opposite the second roller 33 is arc-shaped and contacts the first roller 58. Therefore, the coil spring may be maintained to have a constant length even when the operation unit 50' rotates.

The rail 62 extends from the connecting portion 60' to the first roller 58. When the operation unit 50' is mounted in the cam recess 34', the second roller 33 slides on the rail 62 and guides the operation unit 50'.

Figure 7:
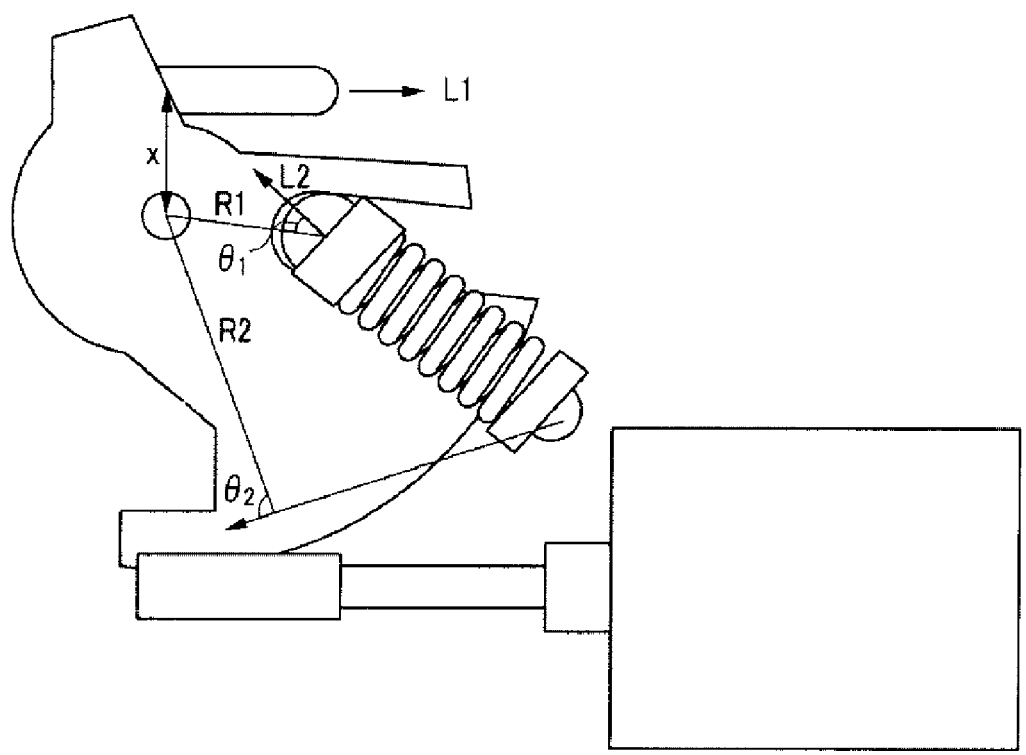
FIG. 7 is a schematic diagram illustrating the operation of the clutch actuators of FIGS. 1 and 4 in accordance with various aspects of the invention.

Referring to FIG. 7, operation of the above-described clutch actuators according to the exemplary embodiments of the present invention will hereinafter be described.

FIG. 7 is a schematic diagram for explaining an operation of a clutch actuator according to exemplary embodiments of the present invention.

As shown in FIG. 7, assuming that a distance from the shaft 38 to the seat 52 is represented as R1, the elastic force of the elastic member 54 is represented as L2, an angle between directions L2 and R1 is represented as θ1, and a distance from the shaft 38 to the operation rod 70 is represented as x at an initial state, force L1 of the operation rod is represented as in Equation 1. If it is assumed that an angle between directions L1 and x is a right angle.

$$L1 = L2*R1*\sin\theta 1/x \qquad \text{Equation (1)}$$

At this state, if the motor 20 is operated and the worm wheel 30, 30' is rotated, the operation unit 50, 50' rotates along the cam recess 34, 34'. In addition, the cam recess 34, 34' is configured such that the elastic force L2 of the elastic member 54 is maintained within the predetermined range when the worm wheel 30, 30' rotates. Assuming a distance from the shaft 38 to the seat 52 is represented as R2 and an angle between directions of L2 and R2 is represented as θ2 at a state that the worm wheel 30, 30' rotates to the limit, the force L1 of the operation rod is represented as in Equation 2. Here, it is assumed that θ2 is 90°.

$$L1 = L2*R2*\sin\theta 2/x = L2*R2/x \qquad \text{Equation (2)}$$

Comparing Equation 2 with Equation 1, the force L1 of the operation rod 70 applied to the fork or the clutch cover is increased because R2 is larger than R1*sin θ1. Accordingly, the clutch is engaged.

When the motor 20 rotates in the opposite direction, the force L1 of the operation rod 70 applied to the fork or the clutch cover decreases and thus the clutch is released.

Meanwhile, means for supplying an elastic force in the direction opposite to the L1 direction may be mounted on the clutch cover or the fork.

As described above, because operation of a clutch is controlled by a motor, a clutch actuator of this invention can be easily applied to a double clutch transmission or an automated manual transmission. It should be noted that although, in the equations above, the angle between directions L1 and x, as well as θ2, were somewhat arbitrarily set as 90° for the sake of simplicity, the scope of the invention is of course not limited to any specific angles.

As described above, because operation of a clutch is controlled by a motor, the exemplary clutch actuators can be used for a variety of transmission, including double clutch and automated manual transmissions.

In addition, because power of a motor is used in order to rotate a worm wheel, and a clutch is operated by elastic force of an elastic member, a motor with a low capacity can be used for a clutch actuator of this invention.

For convenience in explanation and accurate definition in the appended claims, the terms "interior", "longitudinal", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A clutch actuator comprising:
    a motor provided with a rotatable worm shaft, a screw thread formed along an exterior circumference of the worm shaft;
    a worm wheel provided with a worm gear engaging the screw thread, and a cam recess;
    an operation rod mounted to the worm wheel, the operation rod configured to engage or release a clutch; and
    a rotatable operation unit disposed within the cam recess, and configured to apply elastic force to the worm wheel;
    wherein the operation unit comprises:
    at least two supporting rods disposed substantially parallel to each other;

at least two elastic members applying the elastic force along a predetermined direction of the supporting rods;

a rotatable connecting portion connected to first ends of the supporting rods;

at least two seats mounted at respective second ends of the supporting rods receiving the elastic force from the elastic members; and a first roller connecting the at least two seats, disposed in the cam recess, and configured to apply the elastic force of the elastic members to the worm wheel.

2. The clutch actuator of claim 1, wherein the cam recess is configured such that elastic force applied to the worm wheel by the operation unit is maintained within a predetermined range when the worm wheel rotates.

3. The clutch actuator of claim 1, wherein the operation unit further comprises:

a rail extending from the connecting portion to the first roller.

4. The clutch actuator of claim 1, wherein the elastic members are coil springs, each coiled around one of the supporting rods.

5. The clutch actuator of claim 4, wherein the cam recess is configured such that the length of the coil springs is maintained within a predetermined length range when the worm wheel rotates.

6. The clutch actuator of claim 3, wherein the elastic members are coil springs, each coiled around one of the supporting rods.

7. The clutch actuator of claim 6, wherein the cam recess is configured such that the length of the coil springs is maintained within a predetermined length range when the worm wheel rotates.

8. The clutch actuator of claim 3, wherein a second roller for guiding the operation unit on the rail is mounted at a surface of the cam recess.

9. The clutch actuator of claim 1, wherein each supporting rod is a telescoping cylinder such that the length thereof can be changed.

10. The clutch actuator of claim 3, wherein each supporting rod is a telescoping cylinder such that length thereof can be changed.

11. The clutch actuator of claim 1, wherein each supporting rod includes an inner rod slidably disposed in an outer rod.

12. The clutch actuator of claim 3, wherein each supporting rod includes an inner rod slidably disposed in an outer rod.

* * * * *